July 4, 1933.　　　　M. OVESTRUD　　　　1,916,682
BEARING STRUCTURE
Filed June 4, 1932　　　　2 Sheets-Sheet 1

INVENTOR
MELVIN OVESTRUD
By Paul, Paul Moore
ATTORNEYS

INVENTOR
MELVIN OVESTRUD
By Paul, Paul Moore
ATTORNEYS

Patented July 4, 1933

1,916,682

UNITED STATES PATENT OFFICE

MELVIN OVESTRUD, OF MINNEAPOLIS, MINNESOTA, ASSIGNOR TO PIONEER GRAVEL EQUIPMENT MANUFACTURING COMPANY, OF MINNEAPOLIS, MINNESOTA, A CORPORATION OF DELAWARE

BEARING STRUCTURE

Application filed June 4, 1932. Serial No. 615,341.

This invention relates to new and useful improvements in bearing structures, and more particularly to such structures adapted for use to support a reciprocable member and the driving means therefor.

There are arrangements of mechanisms used in the various trades where it is necessary to protect against dirt and abrasive materials, bearings mounted on an eccentric shaft in such a manner that one set of bearings will provide a support for the shaft in a stationary pillow block, and another set of bearings will provide for the rotation of the eccentric of the shaft in some reciprocating or vibrating member of the apparatus. For example, in the construction of stone crushers, an eccentric shaft is sometimes employed for actuating the jaws of the crusher, and to minimize friction, it is desirable to use suitable antifriction bearings. When such bearings are used, it is highly essential that means be provided for preventing dirt, grit, and other foreign matter from entering the bearings, whereby the apparatus may be operated in dust laden air without danger of the bearings thereof being damaged as a result of dust and grit entering the bearings thereof.

It is also essential in heavy duty apparatus of the general type above mentioned, that the bearings which support the shaft in the pillow blocks be arranged in close proximity to the bearings which support the pitman upon the eccentric portion of the shaft, so as to shorten as much as possible the distance between these bearings, whereby the eccentric shaft is greatly strengthened, and in some cases may be made smaller in size for a given machine, without danger of weakening the structure.

The novel bearing structure herein disclosed, comprises labyrinth seals which are disposed between the bearings at each end of the eccentric, and each of which comprises a plurality of interlocking members so arranged that it is practically impossible for dirt and foreign matter to enter the bearings when the apparatus is in operation.

Other objects of the invention are to provide means for excluding dirt and foreign matter from bearings arranged in close proximity and where one bearing is mounted in a fixed support and the other upon an eccentric provided upon the shaft; a bearing structure particularly applicable for use in connection with the eccentric shaft of a stone crusher or other mechanism, having bearings mounted thereon between which a labyrinth seal is interposed, said seal being comparatively short in a direction lengthwise of the shaft whereby the bearings may be arranged in close proximity; in the novel construction of the outwardly directed flanged member secured to the reciprocable part which is adapted to be received in an inwardly facing channel member secured to the fixed bearing member or block; and, in the simple and inexpensive construction of the various parts of the seal, and in the unique organization of said parts.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

Figure 1:
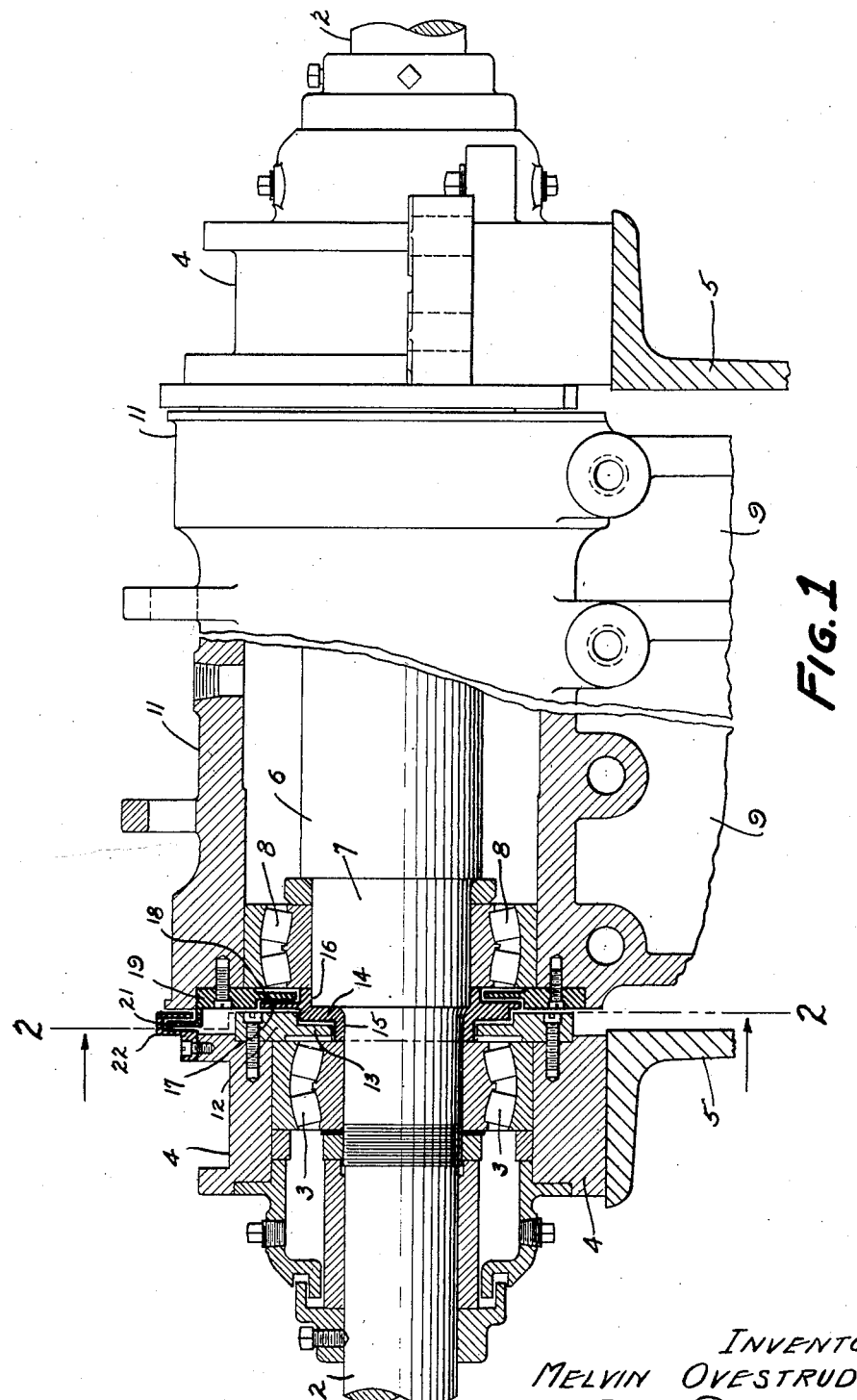
Figure 1 is a view, partially in section, showing the general construction of the labyrinth seal provided between the bearings at each end of the eccentric.

In the selected embodiment of the invention here shown, for purposes of disclosure, there is illustrated in Figure 1, an eccentric shaft 2 shown supported in suitable anti-friction bearings 3 mounted in suitable pillow blocks 4, which may be secured to suitable supporting rails 5. The shaft 2 has an eccentric 6, shown provided at its ends with reduced portions 7, adapted to receive suitable anti-friction bearings 8, which preferably are of the self-alining type. A pitman 9 is shown with a suitable head 11 bored to receive the anti-friction bearings 8 on the eccentric. As the bearing structures at the ends of the eccentric are alike, but one will be described in detail.

In such structures as stone crushers, particularly when using anti-friction bearings as illustrated in Figure 1, it is essential to provide means for preventing dirt and foreign matter from entering the bearings, and heretofore, this has usually been accomplished by providing a separate set of closures or seals for each bearing, which has made it necessary to separate the adjacent bearings at each end of the shaft a considerable distance part, to provide room for the dust excluding means. When the adjacent bearings at each end of the shaft are thus spaced apart, the diameter of the shaft is usually enlarged in order that the shaft may resist the severe strains imparted thereto without deflecting. To thus enlarge the shaft requires the enlargement of the associated parts, which adds to the cost of the apparatus, and provides a very heavy structure.

The novel dust and dirt excluding means disclosed in this invention is of such a nature that the bearings 3 and 8 provided at each end of the pitman, may be arranged in close proximity so as to greatly strengthen the shaft at these points, with the result that the shaft for a given machine may be made comparatively smaller in diameter, as will readily be understood by reference to Figure 1. As here shown, a suitable annular ring 12 is secured to the inner face of the pillow block 4 and has an inwardly directed radial flange 13. A suitable member or collar 14 has a bore 15 adapted to receive the shaft 2, and is provided with a counterbore 16 at its inner face adapted to receive the adjacent end of the reduced portion 7 of the eccentric 6. An outwardly extending circular flange 17 is provided upon the member 14 and overlies an inwardly extending annular flange 18 provided upon an annulus 19 secured to the head 11 of the pitman 9. The flange 18 of the annulus 19 is offset from the end face thereof to provide an annular recess adapted to receive the flange 17. The flanges 17 and 18 are in axial relation to the eccentric 6.

Figure 2:
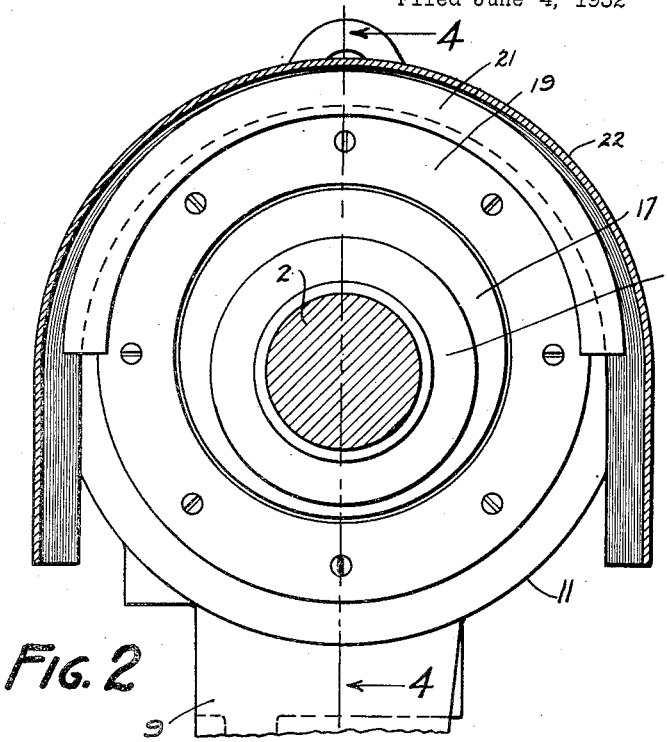
Figure 2 is a cross-sectional view on the line 2—2 of Figure 1, showing the position of the web carried by the head of the pitman, when the latter is at the upper end of its stroke, when viewed as shown in Figure 1.
Figure 4:
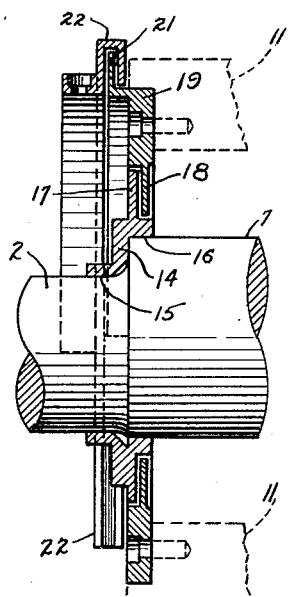
Figure 4 is a vertical sectional view on the line 4—4 of Figure 2, with some of the parts omitted.
Figure 3:
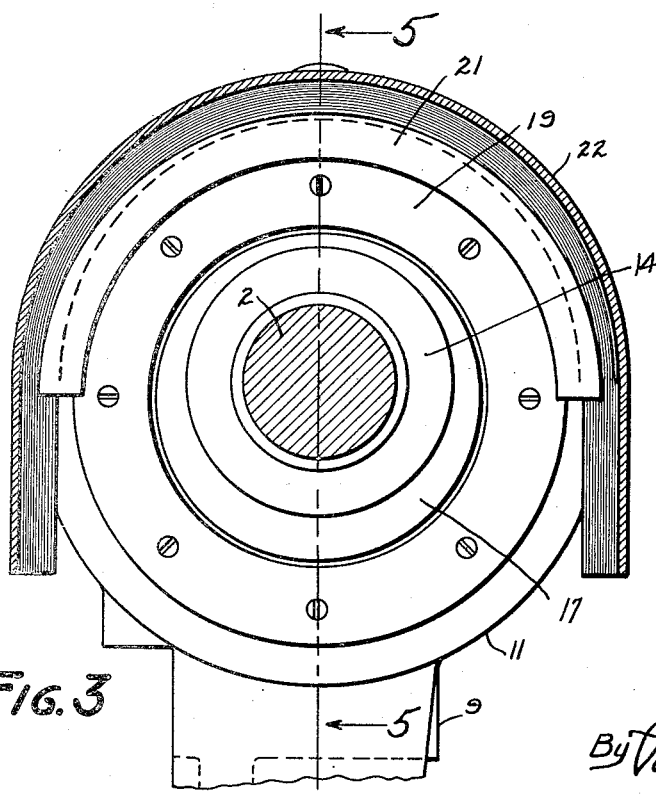
Figure 3 is a view similar to Figure 2, showing the position of the parts when the eccentric is in a position diametrically opposite from that shown in Figure 2.
Figure 5:
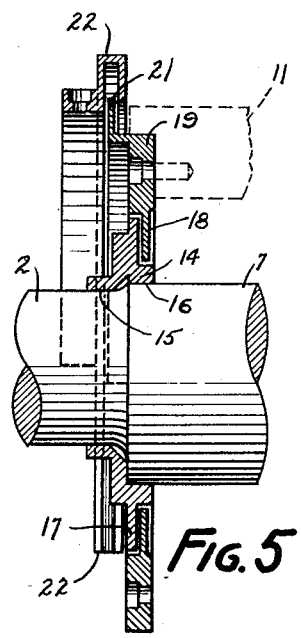
Figure 5 is a vertical sectional view on the line 5—5 of Figure 3.

The annulus 19 is provided at its upper portion, when viewed as shown in the drawings, with an offset web 21, which preferably is semi-circular in configuration, as shown in Figures 2 and 3, and is adapted to be received in an inwardly facing channel member 22, secured to the pillow block 4, as shown in Figure 1. The depth of the channel provided in the member 22 is such that when the shaft 2 and eccentric 6 are rotated, the outwardly directed flange 21 of the annulus 19 will move up and down in the channel, as is clearly illustrated in Figures 2 to 5, inclusive, thereby positively preventing any dirt or foreign matter from entering between these parts. It will also be noted that because of the flanges 17 and 18 being arranged comparatively close to one another, as shown in Figures 1, 4, and 5, and because of the rotation of the flange 17, that it will be practically impossible for any foreign matter to enter between these flanges. In like manner, the spacing between the flange 13 and the member 14 is also such as to prevent foreign matter from creeping between these parts into the bearing 3.

In actual practice, it has been found that the novel labyrinth sealing means herein disclosed, provides a very effective means for preventing dirt and foreign matter from entering adjacent bearings. The construction of the various parts thereof is very simple, and the parts may readily be interposed between the bearings 3 and 8, as shown in the drawings, and when thus positioned, provides substantially a positive seal against the entrance of dirt and foreign matter into the bearings. The bearings at each end of the eccentric may also be arranged in close proximity, whereby the usual objectionable overhang of the shaft is dispensed with, and the shaft correspondingly strengthened.

I claim as my invention:

1. In a bearing structure, a bearing block having an anti-friction bearing mounted therein, a shaft supported in said bearing and provided with an eccentric, a pitman having a head at one end provided with an anti-friction bearing adapted to receive said eccentric, said bearings being disposed in close proximity to one another, and means between said bearings for preventing foreign matter from entering therein, said means comprising a member provided with a bore adapted to receive said shaft and having a counterbore adapted to receive one end of the eccentric whereby said member will rotate therewith, an outwardly extending radial flange on said member, an annulus secured to the pitman head and having means thereon cooperating with said flange to provide a seal for the bearing on said eccentric, an inwardly facing channel on the bearing block, and a web secured to the pitman head and received in said channel member.

2. In a bearing structure, a bearing block having an anti-friction bearing mounted therein, a shaft supported in said bearing and provided with an eccentric, a pitman having a head at one end provided with an anti-friction bearing adapted to receive said eccentric, said bearings being disposed in close proximity to one another, and means between said bearings for preventing foreign matter from entering therein, said means comprising a member secured to said shaft and said eccentric and rotatable therewith, said member having an outwardly extending annular flange cooperating with means on the pitman head to provide a seal for the bearing on the eccentric, a channel member secured to said bearing block, and a semi-circular web secured to the piston head and received in said channel member.

3. In a bearing structure, a bearing block having an anti-friction bearing mounted therein, a shaft supported in said bearing and provided with an eccentric, a pitman having a head at one end provided with an anti-friction bearing adapted to receive said eccentric, said bearings being disposed in close proximity to one another, over-lapping members secured to the shaft and to the piston head and forming a seal for the bearing on the eccentric, a member secured to the bearing block and having a portion over-lapping the member secured to said shaft and cooperating therewith to provide a seal for the bearing in said bearing block, a U-shaped channel member secured to the bearing block, and a semi-circular web on the eccentric received in said channel and having an eccentric motion therein, said web and channel cooperating with said overlapping means to prevent foreign matter from entering the bearings.

4. In a bearing structure, a block having a bearing therein, a shaft supported in said bearing and provided with an eccentric, a head having a bearing receiving said eccentric, said bearings being disposed in close proximity to one another, and means between said bearings for preventing foreign matter from entering therein, said means comprising a member provided with a bore receiving said shaft and having a counterbore adapted to receive one end of the eccentric whereby said member will rotate therewith, an outwardly extending radial flange on said member, an annulus on said head cooperating with said flange to provide a seal for the bearing of the eccentric, an inwardly facing channel on the bearing block, and a web secured to said head and received in said channel.

5. In a bearing structure, a block having a bearing therein, a shaft supported in said bearing and provided with an eccentric, a head having a bearing receiving said eccentric, said bearings being disposed in close proximity to one another, and means between said bearings for preventing foreign matter from entering therein, said means comprising a member provided with a bore receiving said shaft and having a counterbore whose axis is offset from the axis of said bore, said counterbore being adapted to receive one end of the eccentric whereby the member will rotate therewith, an outwardly extending radial flange on said member concentric with the eccentric, and an inwardly extending flange on said head cooperating with the flange on said member to provide a seal for said bearings.

6. In a bearing structure, a block having a bearing therein, a shaft supported in said bearing and provided with an eccentric, a head having a bearing receiving said eccentric, said bearings being disposed in close proximity to one another, and means between said bearings for preventing foreign matter from entering therein, said means comprising a member having a body portion provided with a concentrically disposed bore receiving said shaft, said body portion also having a counterbore whose axis is offset from the axis of said bore and is adapted to receive one end of the eccentric whereby the member will rotate therewith, an outwardly extending radial flange on said body portion concentric with the eccentric, and an annulus on said head having an inwardly extending portion cooperating with the flange on said body portion to provide a seal for the bearing of the eccentric, and means secured to said bearing block in concentric relation to said body portion and cooperating therewith to provide a seal for the bearing in said block.

In witness whereof, I have hereunto set my hand this first day of June 1932.

MELVIN OVESTRUD.